March 2, 1954
G. GRANTHAM
2,670,658
ADJUSTABLE MOUNTING FOR SPECTACLES
Filed April 30, 1951
2 Sheets-Sheet 1
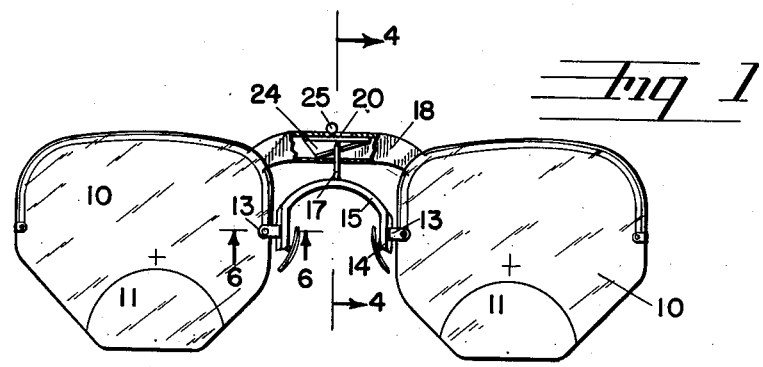
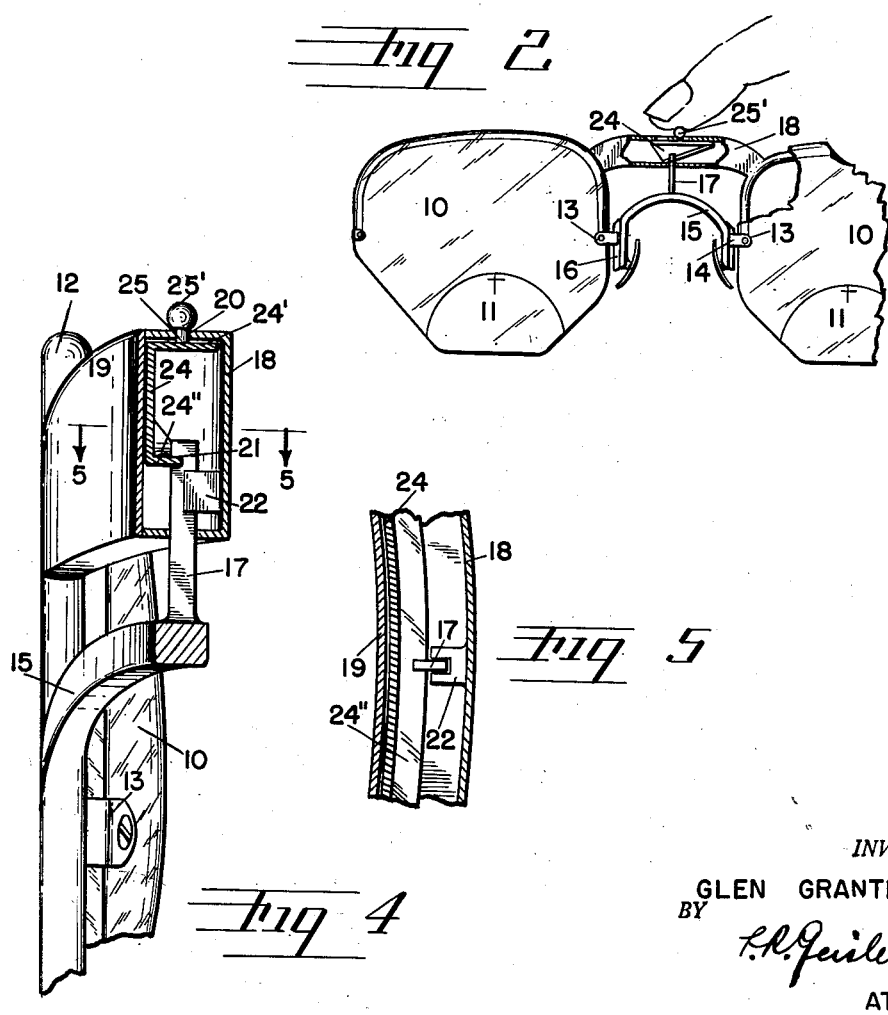
INVENTOR.
GLEN GRANTHAM
BY
ATTORNEY March 2, 1954  G. GRANTHAM  2,670,658
ADJUSTABLE MOUNTING FOR SPECTACLES
Filed April 30, 1951  2 Sheets-Sheet 2

INVENTOR.
GLEN GRANTHAM
BY
ATTORNEY

Patented Mar. 2, 1954

2,670,658

UNITED STATES PATENT OFFICE 2,670,658

ADJUSTABLE MOUNTING FOR SPECTACLES

Glen Grantham, Portland, Oreg.

Application April 30, 1951, Serial No. 223,754

3 Claims. (Cl. 88—49)

This invention relates in general to multi-focal spectacles, and more specifically, to spectacles or eye glasses having bifocal or multi-focal lenses on which portions of the lenses are used for distant vision and portions are used for near vision, as for example in reading.

As is well known, in common bifocal lenses for spectacles the lens sections are normally so arranged and the spectacles so positioned or mounted that the wearer of the spectacles looks downwardly through the lenses when using the near vision lens portions and looks straight ahead or upwardly when using the distant vision lens portion. However, frequently the wearer of spectacles with such multi-focal lenses may desire to use the reading or lower or near vision lens portions while looking straight ahead and without being obliged to tilt the head back. For this purpose various means have previously been tried whereby the position of the spectacles, and thus of the lenses, may be adjusted vertically to accommodate the position of the lens segments to the convenience of the wearer.

One objection I have found with some of these vertically adjustable spectacles is that the spectacles must be removed from the wearer each time such adjustment to raise or lower the spectacles is made.

An object of the present invention is to provide an improved adjustable mounting for multi-focal spectacles which will enable the wearer to adjust them to a higher or lower position without having to remove them.

A related object of the invention is to provide an adjustable spectacle mounting which can be adjusted by the wearer while the spectacles are in place and which will require the use of only one hand on the part of the wearer for such adjustment.

Another objection to some of the adjustable mountings which have previously been invented is that they are too large or conspicuous or otherwise give a grotesque appearance to the spectacles, and consequently on that account they have not been favorably received.

A further object of the present invention is to provide an improved and simplified adjustable mounting for spectacles which will not cause them to appear grotesque or unduly conspicuous.

An additional object of the invention is to provide an adjustable spectacle mounting of the character indicated which is simple in construction and quick and easy to manipulate.

The construction of my improved spectacle mounting and the manner in which the same operates will be readily understood from the following brief description with reference to the accompanying drawings.

In the drawings:

Fig. 1 is a front elevation of a pair of bifocal spectacles having my adjustable mounting, a portion of the front of the hollow top bar connecting the two frames being shown broken away to exhibit the adjustable cam slide within the bar. The spectacles in this figure are shown in lowered or normal position.

Fig. 2 is a front elevation of portion of the same spectacles, with part of the front of the connecting top bar and part of one of the lenses broken away. This figure shows the spectacles in raised position.

Fig. 4 is a transverse vertical section taken on line 4—4 of Fig. 1 but drawn to a greatly enlarged scale;

Fig. 5 is a fragmentary plan section on line 5—5 of Fig. 4;

Figure 3:
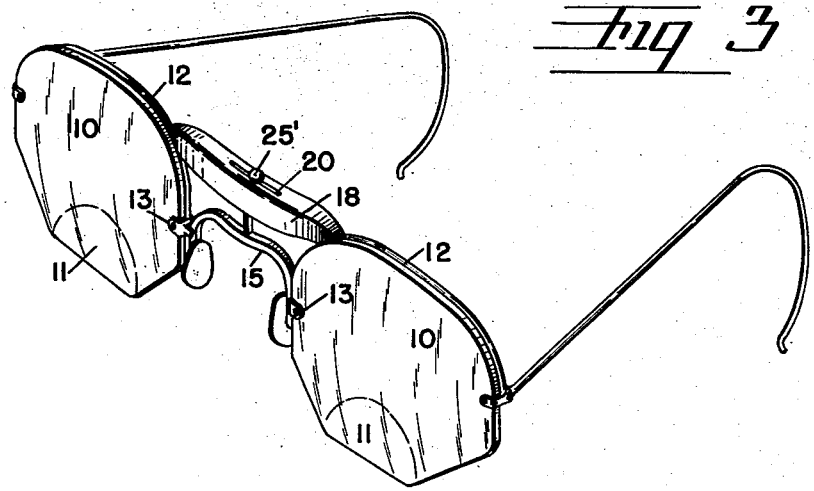
Fig. 3 is a perspective view of the spectacles corresponding to Fig. 1.

In the drawings the two spectacle lenses are indicated by the reference character 10 and each lens has the usual lower near view or reading segment 11. The direct or horizontal line of vision of the wearer of the spectacles is assumed to be through some such point as indicated by the small cross marks in Figs. 1, 2 and 3.

Figure 6:
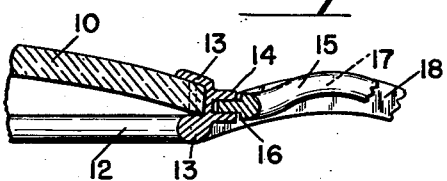
Fig. 6 is a fragmentary section on line 6—6 of Fig. 5, looking in the direction indicated by the arrows and drawn to a greatly enlarged scale.
Figure 7:
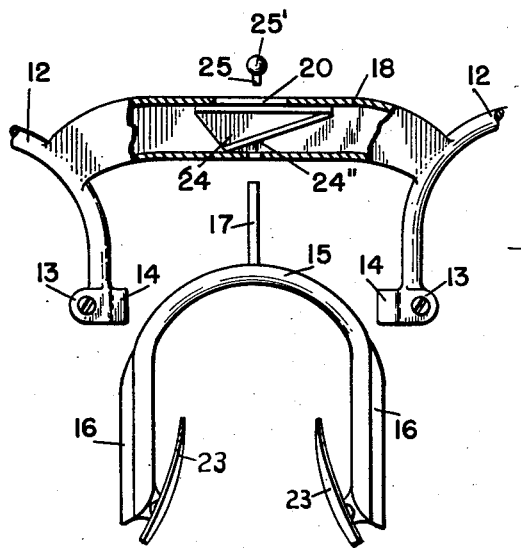
Fig. 7 is a view of the bridge member and connecting bar with the adjacent portions of the lens frames, the front of the connecting bar in part being broken away.

Each lens is secured to a frame 12 which extends around behind the upper rim of the lens, and the two frames 12, 12 are rigidly connected by a hollow bar or housing 18. The inner end of each frame 12 is formed with the customary pair of ears 13 and a lens securing and clamping screw extends through each pair of ears and the interposed lens in the usual manner. Also the inner end of each frame has an inwardly extending bifurcated lug 14 (shown most clearly in Figs. 6 and 7) and these bifurcated lugs serve as tracks or guideways for an adjustable bridge member 15.

The bridge member 15 has two straight side portions and a rounded or curved, and preferably slightly outwardly bowed, top portion. A rib 16 (shown most clearly in Figs. 6 and 7) extends along the outer face of each side portion of the bridge member and is adapted to slide in the track or guideway formed by the respective bifurcated lug 14.

An integral stem or shaft 17 extends upwardly from the center of the top portion of the bridge member 15. This stem 17 extends into the hollow bar or housing 18 through a hole in the bottom of the hollow bar 18.

The hollow bar 18 may be formed in several ways, but I prefer to make it in the form of a curved channel member, with integral top, bottom and front faces, and with a rear cover plate 19 (Fig. 4) which may be secured on the bar by small screws (not shown) or in any other suitable manner so as to complete the housing closure provided by the bar 18. A guiding bifurcated lug 22 (Figs. 4 and 5) is secured on the inside of the front wall of the hollow bar 18 at the center near the bottom and in alignment with the hole through which the bridge member stem 17 extends so as to serve as a guideway for the stem 17.

A cam slide 24, having a top flange 24' of approximately the same width as the interior of the hollow bar 18 (see Fig. 4) and having a narrower, upwardly-sloping bottom cam flange 24", is longitudinally slidable within the hollow bar 18. The stem 17 of the bridge member 15 has a notch 21 which engages the bottom flange 24" of the cam slide 24, as shown in Fig. 4. Thus it will be apparent that longitudinal movement of the cam slide 24 within the hollow bar 18 will result in up or down movement of the stem 17 and therewith of the bridge member 15.

The top of the hollow bar 18 has a longitudinal slot 20 which extends a short distance beyond the center of the top of the bar 18 in either direction. A pin 25 (Figs. 4 and 7) is secured in the top 24' of the cam slide 24 and extends through this slot 20. The top of the pin 25 carries a small finger knob 25'. Nose pads 23 are attached to the bridge member 15 as usual, in any suitable manner.

From the drawings and from the foregoing description, it will now be apparent that the moving of the pin knob 25' by the finger of the wearer of the spectacles (as illustrated in Fig. 2), in one direction will serve to raise the bridge-member with respect to the hollow bar 18 and lens frames 12, or, in other words, will lower the spectacle lenses with respect to the bridge member 15 and nose pads 23; and similarly movement of the pin knob 25' in the other direction by the wearer of the spectacles will produce the opposite result. Thus when the spectacles are in place on the nose of the wearer, the wearer can, by moving the knob 25' with his finger, adjust the height of the spectacle lenses to suit his purpose and convenience. It is not necessary for the wearer to remove the spectacles, nor does he need to grip them with both hands in order to adjust them, as is required with some of the other mountings previously designed to serve a similar purpose.

If the wearer does not desire to raise the lenses to the extreme position provided by the mounting, he can regulate the amount of adjustment by the extent to which he moves the knob 25'. My device thus has the advantage of enabling partial adjustments to be made instead of limiting the adjustments to extreme high or low positions as do some of the other adjustable mountings.

Normally of course the wearer will have the spectacles in the lowered or normal position indicated in Fig. 1, in which position he will look downwardly when using the reading or near vision segments of the lenses. Then a slight raising of the lenses in the manner described will bring these near view segments into the horizontal line of vision as indicated in Fig. 2.

Various modifications would of course be possible in the frame portions of the spectacles and in the mountings of the lenses themselves, and similarly, modifications in the construction and design of the hollow bar 18 could be made, without departing from the principle of my invention. It is not my intention to limit my invention otherwise than as set forth in the claims.

I claim:

1. In an adjustable mounting for spectacles of the character described, a pair of lens frames, a hollow bar connecting said frames, a bridge located below said bar, said bridge having straight side portions, nose pads attached to said side portions, said bridge having a central vertical stem extending upwardly from the top of said bridge and into said bar and terminating in said bar, said bridge slidable up and down with respect to said bar and said lens frames, guideways on said frames, said side portions of said bridge slidable in said guideways, a raising and lowering element in said bar for said stem, said element movable longitudinally in said bar, means on the upper end of said stem within said bar slidably engaging said element, and means on said element for moving said element, whereby the moving of said element will raise or lower said stem and therewith said bridge, thereby causing the height of the spectacle lenses to be adjusted with respect to said nose pads.

2. In an adjustable mounting for spectacles, a pair of lens frames, a bar-like housing connecting said frames and holding them in spaced relationship, a bridge located below said bar-like housing, said bridge having straight side portions, nose pads attached to said side portions, said bridge having a central vertical stem extending upwardly from the top of said bridge and into said bar-like housing and terminating in said bar-like housing, said bridge slidable up and down with respect to said bar-like housing and said lens frames, guideways on the inner ends of said frames for said side portions of said bridge, a cam slide movable longitudinally in said bar-like housing, means on the upper end of said stem within said bar-like housing engaging said cam slide, and a pin connected to said cam slide for moving said cam slide, whereby the moving of said cam slide will raise or lower said stem and therewith said bridge, thereby causing the height of the spectacle lenses to be adjusted with respect to said nose pads.

3. An adjustable mounting for spectacles including a pair of lens frames, a hollow bar rigidly connecting said frames, a bridge located below said bar, said bridge having straight side portions, nose pads attached to said bridge, said bridge having a central vertical stem extending upwardly from the top of said bridge and into said bar and terminating within said bar, said bridge slidable up and down with respect to said bar, guideways on said frames, said side portions of said bridge slidable in said guideways, a cam slide having an inclined lower flange movable longitudinally in said bar, a notch on the upper end of said stem within said bar in constant engagement with said lower flange of said cam slide, and a pin connected to said cam slide and extending up above said bar for moving said cam slide, whereby the moving of said cam slide will raise or lower said stem and therewith said bridge, thereby causing the height of the spectacle lenses to be adjusted with respect to said nose pads.

GLEN GRANTHAM.

References Cited in the file of this patent

UNITED STATES PATENTS

| Number | Name | Date |
|---|---|---|
| Re. 20,732 | Yoe | May 17, 1938 |
| 2,057,288 | Bailey | Oct. 13, 1936 |
| 2,277,726 | Splaine | Mar. 31, 1942 |
| 2,304,576 | Krause | Dec. 8, 1942 |